Feb. 21, 1961  C. P. JOHNSON  2,972,430
COLLAPSIBLE SHIPPING VAN
Filed April 14, 1958  6 Sheets-Sheet 4
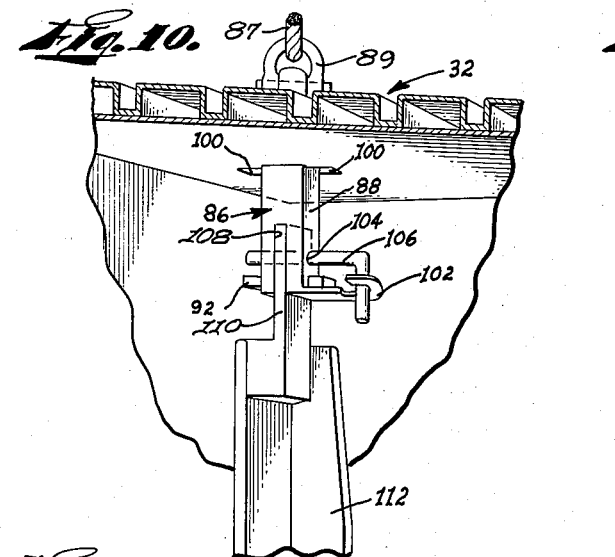
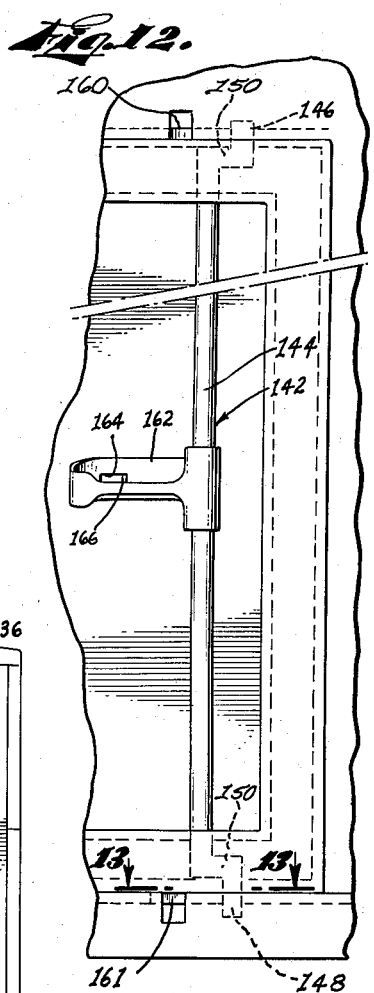
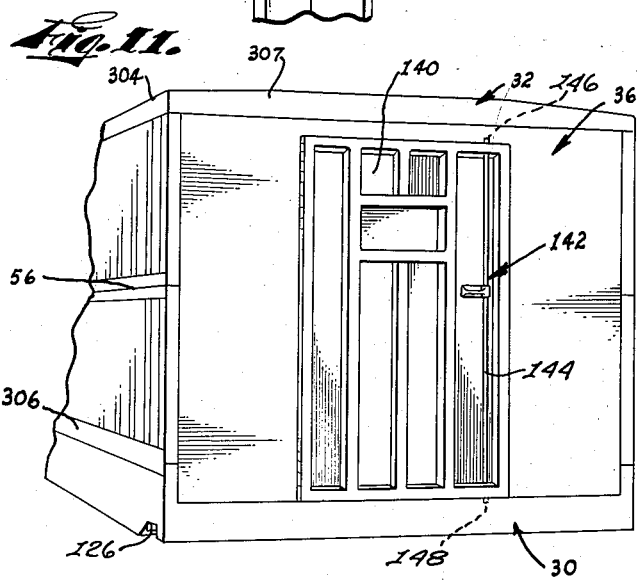
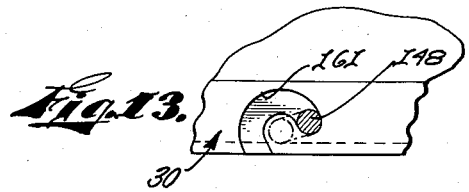
INVENTOR.
CARROLL P. JOHNSON
BY FULWIDER, MATTINGLY
& HUNTLEY
ATTORNEYS Feb. 21, 1961  C. P. JOHNSON  2,972,430
COLLAPSIBLE SHIPPING VAN
Filed April 14, 1958  6 Sheets-Sheet 5
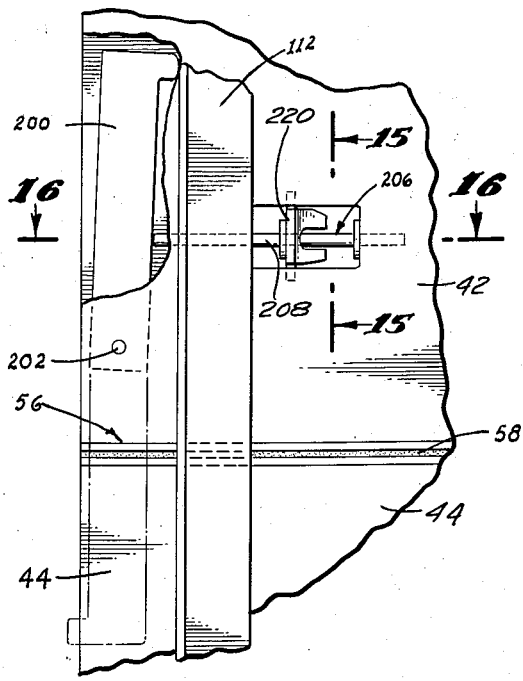
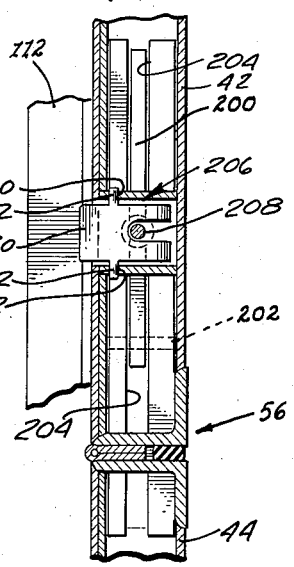
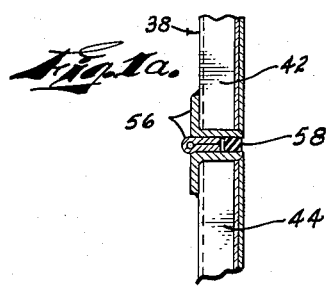
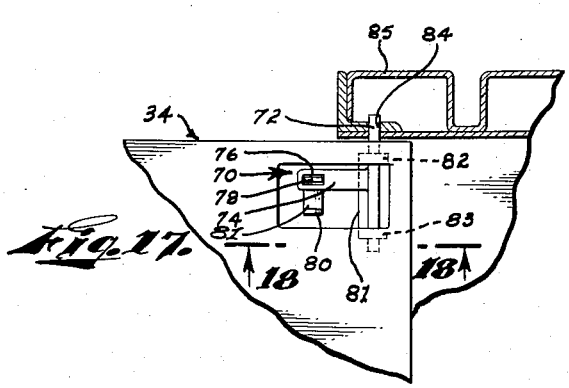
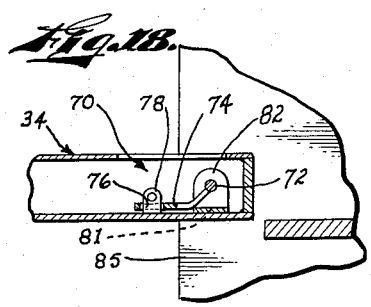
INVENTOR.
CARROLL P. JOHNSON
BY FULWIDER, MATTINGLY
& HUNTLEY
ATTORNEYS

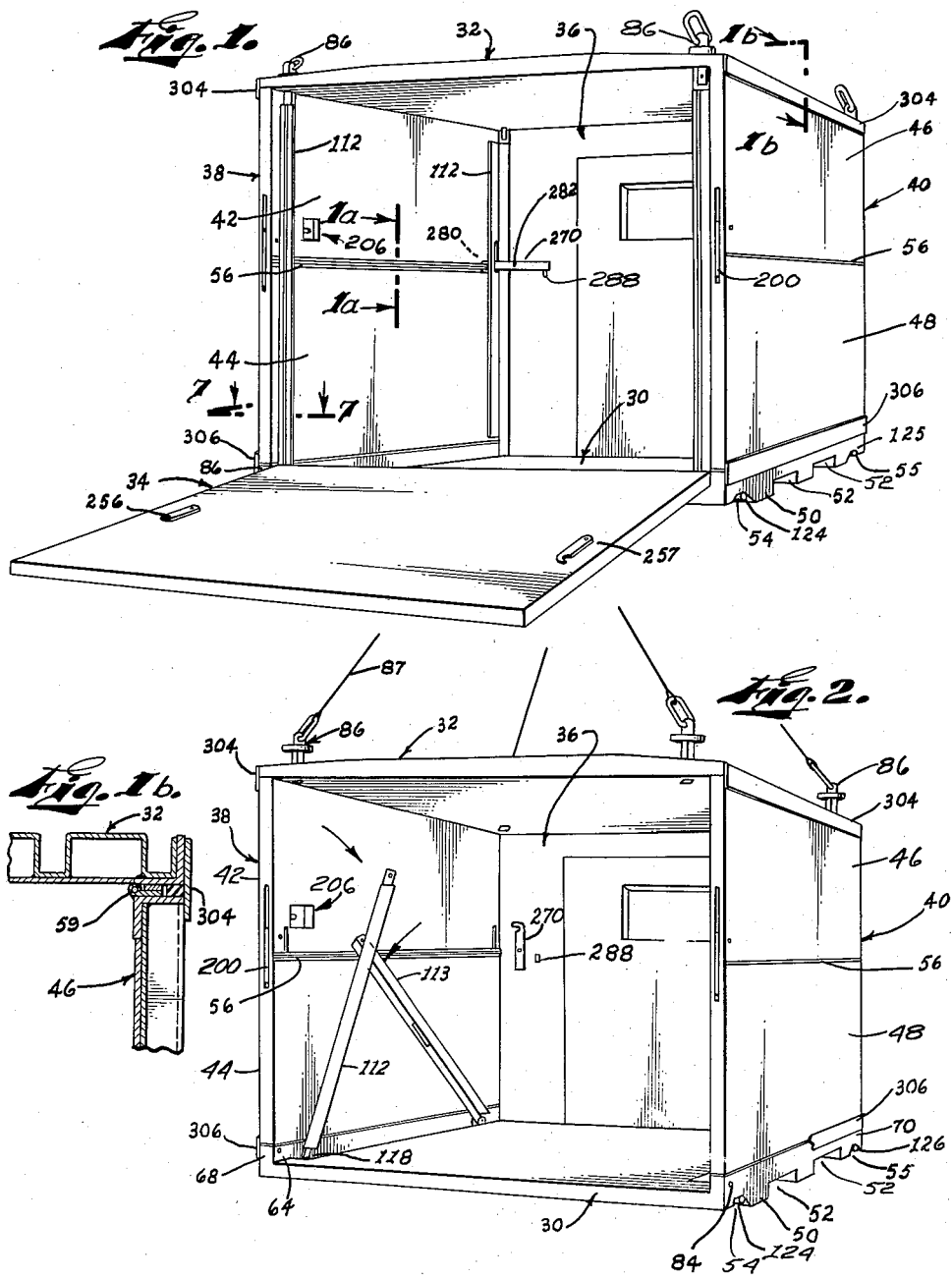

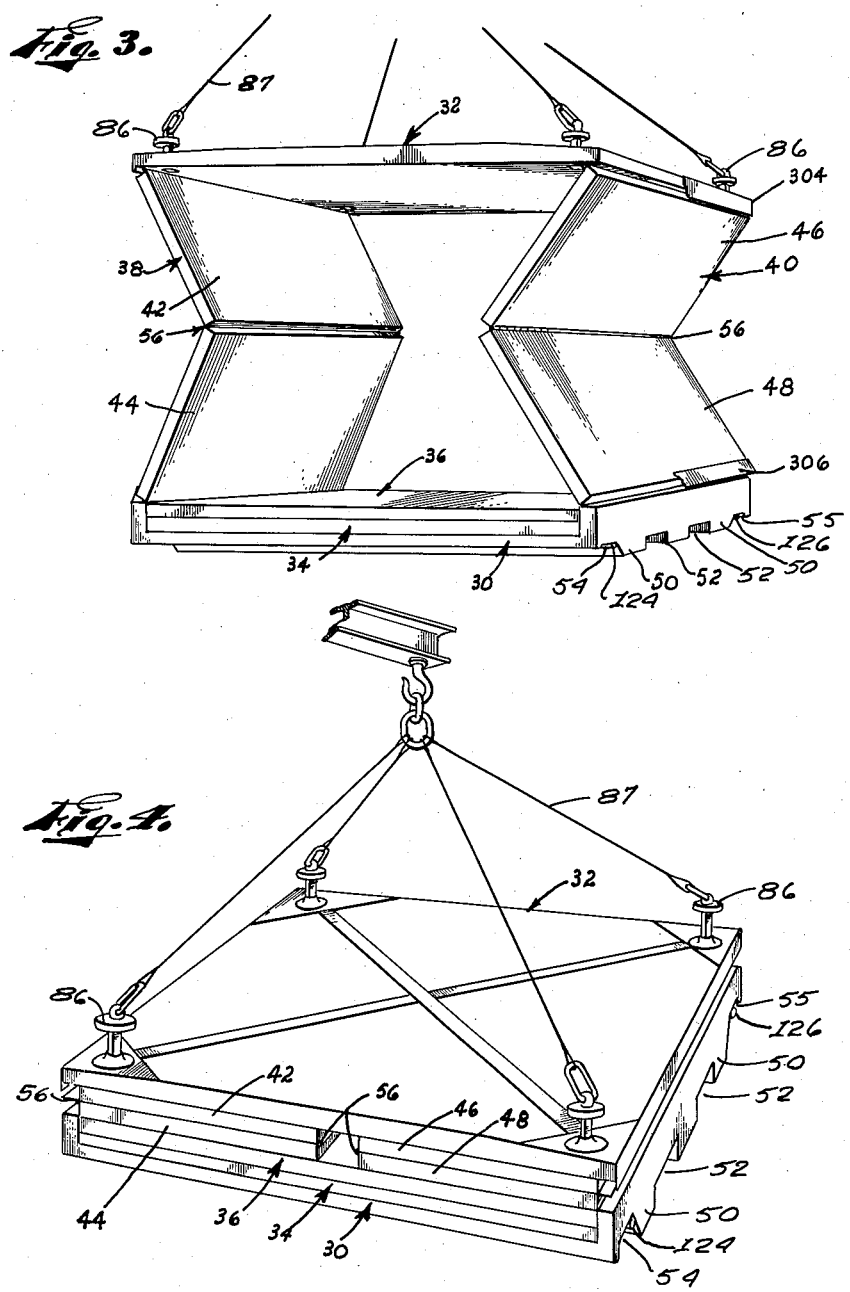

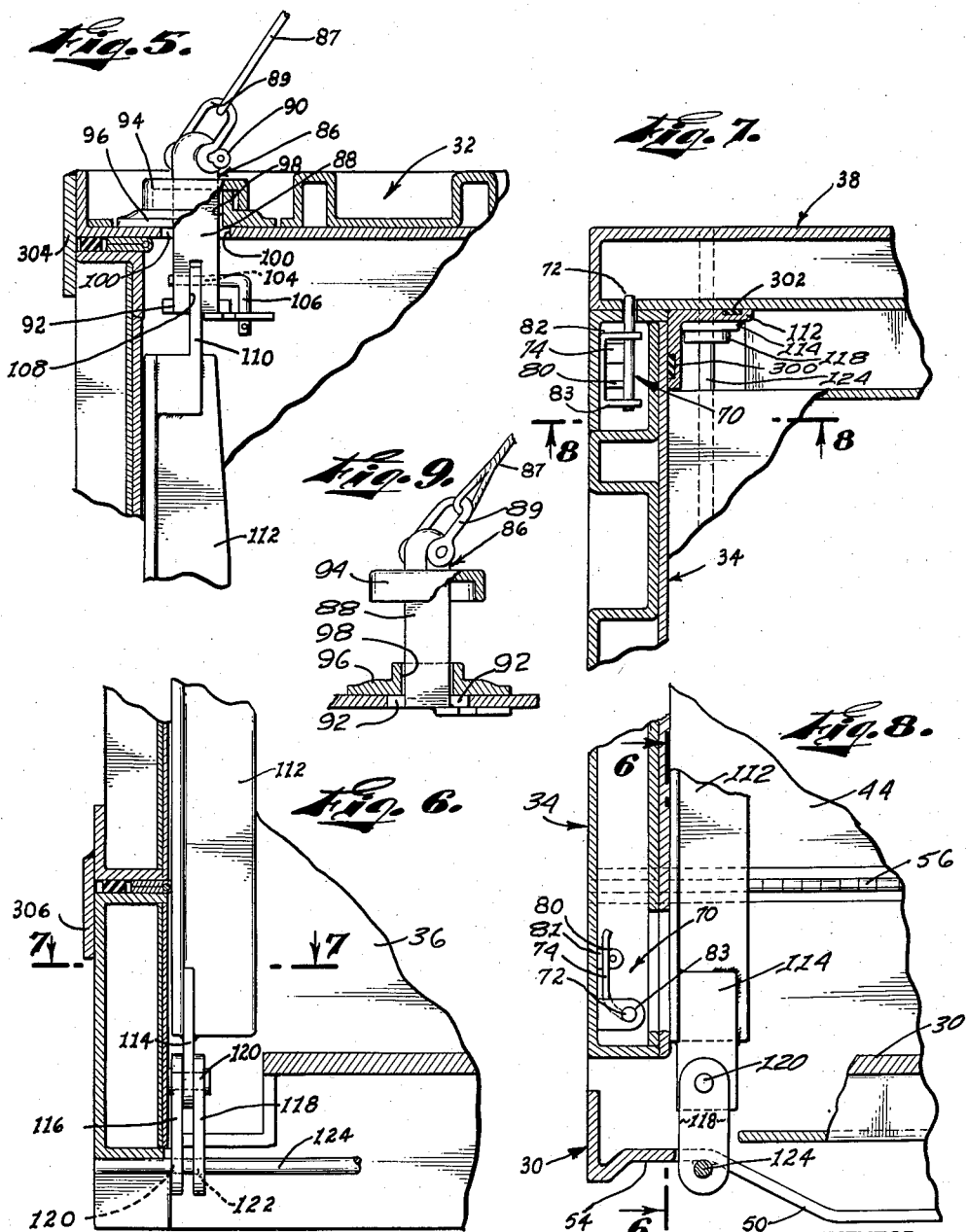

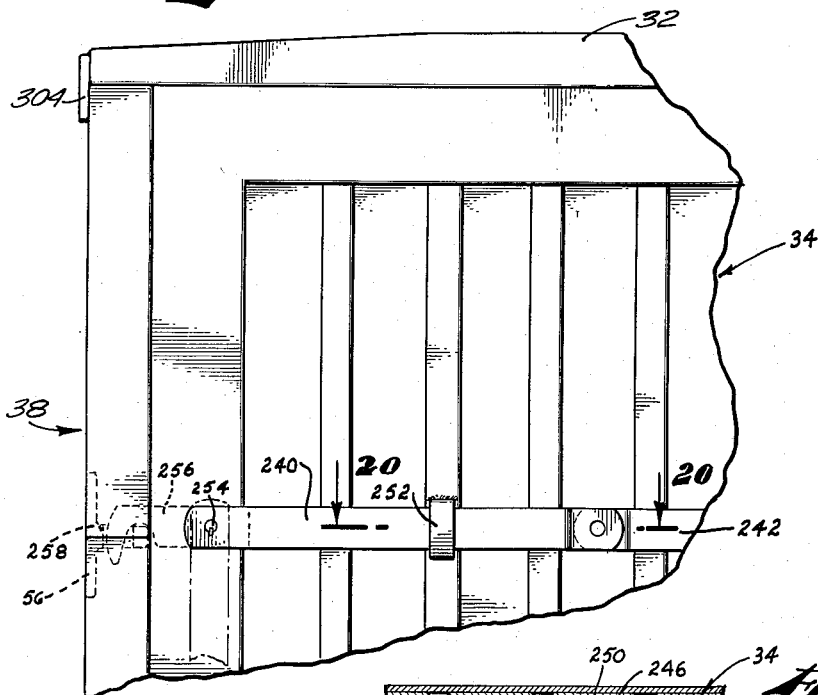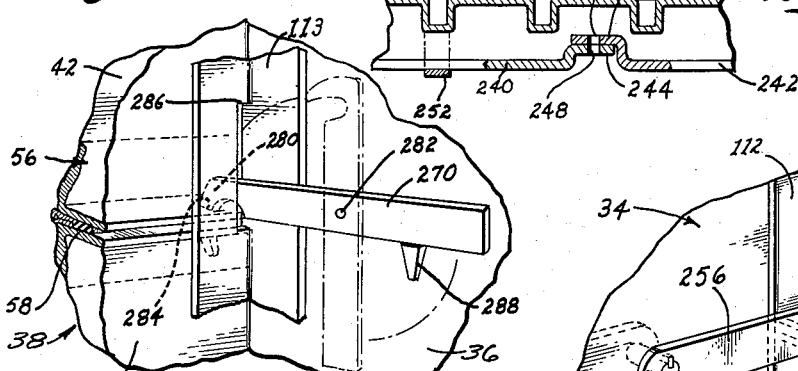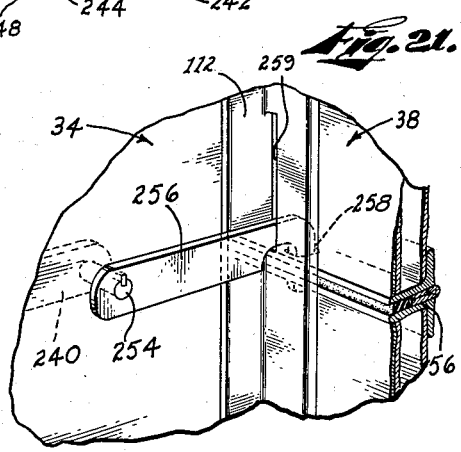

United States Patent Office 2,972,430
Patented Feb. 21, 1961

2,972,430
COLLAPSIBLE SHIPPING VAN
Carroll P. Johnson, San Pedro, Calif., assignor to Collapsible Van Co., San Pedro, Calif., a corporation of California
Filed Apr. 14, 1958, Ser. No. 728,150
17 Claims. (Cl. 220—1.5)

The present invention relates generally to the field of shipping and more particularly to a new and novel collapsible shipping van.

Shipping vans or boxes are widely used for transporting various materials from one location to another, and particularly in maritime shipping. Such shipping vans consist of a box-like structure having a reinforced floor or platform. This platform is generally provided with openings for receiving the lifting forks of a fork lift or its equivalent. After the van is loaded the usual procedure is for a fork lift to raise the van with its load and carry it to a position to be stowed on shipboard by a crane. The shipping vans are generally stacked one upon the other within the hold of the ship and carried to their destination. Upon arrival the shipping vans are opened and the contents unloaded. Alternately, the entire unopened shipping van may be transported to a different location by freight car or truck. After the conventional shipping van has been unloaded, it occupies considerable space relative to the vehicle employed to return it to the location at which it will again be loaded. This is a serious disadvantage since it increases the cost of shipping to a considerable degree.

It is a major object of the present invention to provide a shipping van which will overcome the abovementioned disadvantage by having side and end walls which are inwardly collapsible so as to make it possible to stack these walls on top of one another and thereby form a compact, collapsed assembly which takes up a very small volume and which enables stacking of a large number of empty vans, one on top of the other in a relatively small volume of space.

Another object of the present invention is to provide a collapsible shipping van having a front wall which can be folded outwardly so as to constitute a loading ramp.

Yet another object of the invention is to provide a collapsible shipping van which is so constructed as to be readily collapsed and when so collapsed will occupy minimum space.

An additional object of the invention is to provide a collapsible shipping van which may be readily handled by a conventional fork lift.

A further object of the invention is to provide a collapsible shipping van which is but slightly heavier than conventional non-collapsing vans of the same size.

It is an important object of the present invention to provide a collapsible shipping van having automatically actuable locking means for positively restraining the inadvertent collapse of the opened van.

It is another object of the present invention to provide a collapsible shipping van which is so constructed as to prevent pilfering of objects therefrom.

It is yet a further object of the invention to provide a collapsible shipping van which is simple of design and rugged of construction whereby it may afford a long and useful service life.

Another object is to provide a collapsible shipping van having a sub-door assembly permitting ready access thereto without requiring that the front wall be opened.

A further object is to provide a collapsible shipping van which is comparatively water-tight and will therefor afford maximum protection against water damage of its contents.

An additional object is to provide a collapsible shipping van having means for connection to a lifting cable which are readily accessible even when a number of vans are stowed in close proximity.

Yet an additional object of the invention is to provide a collapsible shipping van wherein all component parts remain positively interconnected while it is in a collapsed condition thereby eliminating possible loss of such parts.

These and other objects and advantages of the present invention will become more apparent from the following detailed description, when taken in conjunction with the appended drawings wherein:

Figure 1 is a perspective view showing a preferred form of collapsible shipping van embodying the present invention with its front panel in a load-receiving position;

Figure 1a is an enlarged vertical sectional view showing a hinge utilized to connect the upper and lower halves of the side walls of said van;

Figure 1b is an enlarged vertical sectional view showing a second hinge utilized to connect the upper side wall halves to the sides of the upper wall;

Figures 2, 3 and 4 are perspective views showing how said shipping van is collapsed;

Figure 5 is an enlarged fragmentary vertical sectional view showing a lifting ring assembly of said shipping van;

Figure 6 is a vertical sectional view taken on line 6—6 of Figure 8;

Figure 7 is a horizontal sectional view taken on line 7—7 of Figure 1;

Figure 8 is a vertical sectional view taken on line 8—8 of Figure 7;

Figure 9 is a fragmentary vertical sectional view showing the lifting ring assembly of Figure 5 arranged in a different position;

Figure 10 is a fragmentary enlarged perspective view showing an interior upper corner of said shipping van;

Figure 11 is a perspective view particularly showing the exterior of the rear wall of said shipping van;

Figure 12 is a perspective view showing a handle utilized with said rear wall;

Figure 13 is a horizontal sectional view taken on line 13—13 of Figure 12;

Figure 14 is a fragmentary side elevational view showing a lock means employed with the side walls of said collapsible shipping van;

Fig. 15 is a vertical sectional view taken on line 15—15 of Figure 14;

Figure 16 is a horizontal sectional view taken on line 16—16 of Figure 14;

Figure 17 is a fragmentary top view showing a hinge employed with the front wall of said shipping van;

Figure 18 is a vertical sectional view taken on line 18—18 of Figure 17;

Figure 19 is a fragmentary exterior front view showing a lock mechanism employed with the front wall of said shipping van;

Figure 20 is a horizontal sectional view taken on line 20—20 of Figure 19;

Figure 21 is a fragmentary perspective interior view showing said lock mechanism; and Figure 22 is a fragmentary interior view showing a lock mechanism for the rear wall of said van.

Referring to the drawings and particularly Figures 1 through 4 thereof, the preferred form of collapsible shipping van embodying the present invention is arranged in its open position of Figure 1 when being loaded or unloaded. At the conclusion of an unloading operation, the van may be collapsed to its position of Figure 4. The van broadly comprises a horizontal floor or platform, generally designated 30, a top wall, generally designated 32, which is parallel to the platform 30, a front wall, generally designated 34, having its lower end pivotally connected to the front of the platform 30, a rear wall, generally designated 36, and having its lower end pivotally connected to the rear of the platform 30, and a pair of side walls, generally designated 38 and 40, respectively. The side wall 38 includes an upper panel 42 and a lower panel 44. Similarly, the side wall 40 includes an upper panel 46 and a lower panel 48. The upper edges of the upper panels 42 and 46 are hingedly connected to the sides of the top panel 32. The lower edges of the lower panels 44 and 48 are hingedly connected to the sides of the platform 30. The lower edge of the upper panel 42 is hingedly connected to the upper edge of the lower panel 44. Similarly, the lower edge of the upper panel 46 is hingedly connected to the upper edge of the lower panel 48. In collapsing the preferred form of shipping van, the front panel 34 is first positioned directly over the platform 30, in a manner to be fully set forth hereinafter. Thereafter, as shown in Figure 3, the rear panel 36 is folded forwardly and inwardly so as to directly overlie the front panel 34. Next, the top panel 32 is lowered so as to permit the side panels 38 and 40 to be folded inwardly until the upper panel 42 directly overlies the lower panel 44 and the upper panel 46 of the opposite side wall directly overlies the lower panel 48. The top panel 32 will then rest upon the originally outwardly-facing surfaces of the upper panels 42 and 46. The van will then appear as shown in Figure 4, and it will be apparent that in its collapsed position a minimum amount of space is occupied.

More particularly, the various aforementioned walls, as well as the floor 30, may be formed of the conventional, rigid materials utilized in existing shipping vans. In practice, such panels have been satisfactorily formed from steel angle frames and sheet steel panels stamped into corrugations. As indicated in Figures 1 through 4, the lowermost sides of the platform 30 are integrally formed with a pair of skids 50. The intermediate portion of these skids are formed with a pair of openings 52 for receiving the lifting forks of a conventional fork lift (not shown). Additionally, forwardly and rearwardly of the skids 50, the platform 30 is formed with upwardly extending notches 54 and 55 for receiving a lifting sling or the like (not shown). Referring now to Figure 1a, the upper and lower panels 42 and 44 of the side wall 38 are pivotally interconnected by a conventional hinge 56. This hinge 56 may extend for the major portion of the length of these panels. A sealing strip 58 is preferably interposed between the adjoining edges of the panels 42 and 44. Such sealing strip may conveniently be formed of natural or synthetic rubber. Similar hinges are employed to connect the upper and lower panels 46 and 48 of the opposite side wall 40. This is likewise true with regard to the interconnection of the lower edge of the rear wall 36 to the rear of platform 30, the interconnection of the lower edges of the panels 44 and 48 to the sides of the platform 40 and the interconnection of the upper edges of the panels 42 and 46 with the sides of the top wall 32. The latter arrangement is shown in Figure 1b wherein a hinge 59 is disclosed.

The lower end of the front wall 34 is pivotally secured to the front portion of the platform 30 by a pair of removable hinge assemblies, the details of one of which are shown in Figures 8, 17 and 18. Referring to the latter figures, there is shown a hinge assembly generally designated 70, and including a hinge pin 72. The hinge pin 72 is integrally connected at its intermediate portion to a hasp 74. This hasp 74 is formed with a slot 76 adapted to receive either of two spaced staples 78 and 80. The latter are rigidly affixed to a plate 81 that is secured to the lower interior portion of the front wall 34. The pivot pin 72 is slidably carried between a pair of ears 82 and 83 formed upon the plate 81. With the hasp 74 arranged so that its slot 76 is received by the outer staple 78, as shown in Figure 17, the outer portion of the pivot pin 72 will be disposed within a bore 84 formed in the lower front portion of an upstanding base 85 formed along one side of platform 30. Suitable means may be provided for temporarily locking the hasp 74 in this position. It should be understood that the opposite side of the front wall 34 is provided with a second hinge assembly (not shown) constituting a mirror image of the hinge assembly 70.

With further reference to Figures 1 through 4, the corner portions of the top walls 32 are each provided with a lifting ring assembly, generally designated 86. These lifting ring assemblies 86 are of identical construction and are each adapted to receive a lifting cable 87. The lifting cables 87 are adapted to be controlled by a crane or the like (not shown). The details of these lifting ring assemblies 86 are particularly shown in Figures 5, 9 and 10. Referring to the latter figures, each lifting ring assembly 86 includes a square-sided body 88, the upper end of which is closed by a semi-hemispherical wall. The upper portion of each body 88 carries a clevis 89 which is held in place by a suitable pin 90. The lower end of each body 88 is formed with a horizontal cross-arm 92. Below the clevis 90 the body 86 is integrally formed with a collar 94. The body 88 is vertically slidably disposed within a socket member 96, this socket member being formed with a vertical passage 98 that slidably carries the body 88. The lower end of the passage 98 intersects a pair of square openings 100 formed in the top wall 32. The dimensions of these openings are slightly larger than that of the portions of the cross-arm 92 extending from the lower end of the body 88. The body 88 tends to fall to its lower position of Figures 5 and 10 under the influence of gravity. At this time its collar 94 will rest upon the socket member 96. When upward force is applied to the body 88 as by lifting cable 87, the body will move to its upper position of Figure 9. At this time the cross-arm 92 will move within the confines of the openings 100.

As shown particularly in Figure 10, a horizontally extending hook 102 is secured to the lower end of the body 88 below cross-arm 92. A bore 104 parallel to the hook 102 is formed a short distance above the cross-arm 92. An L-shaped keeper 106 is rotatably and slidably disposed within the bore 104.

The lower portion of the body 88 is additionally formed with a vertically extending slot 108. This slot intersects the aforementioned bore 104. The slot 108 is adapted to receive a tongue 110 formed at the upper end of a tension rod 112. The lower end of this tension rod 112 is formed with a second tongue 114, as shown in Figure 6. The lower portion of the lower tongue 114 is pivotally affixed to the upper end of a pair of links 116 and 118 by a pivot pin 120. The lower end of the links 116 and 118 are formed with aligned bores 120 and 122 for receiving a bar 124.

Referring again to Figures 1 and 2, it should be understood that the opposite front corner of the shipping van is provided with a mate to the aforedescribed tension link 112, while the rear corners of the van are provided with a similar pair of tension rods designated 113. The lower end of the links 116 and 118 of the front tension rods 112 are carried on a bar 124 while a similar bar 126 is provided for the rear tension rods 112. The front bar 124 extends between the aforementioned notches 54, while the rear bar 126 extends between the rear notches 55, as indicated in Figure 1.

Referring now to Figure 11, the rear wall 36 is provided with an outwardly-opening door 140. One side of this door 140 is provided with a latching mechanism, generally designated 142, the details of which are shown particularly in Figures 12 and 13. The side of the door opposite the latching mechanism 142 is provided with conventional hinge means (not shown). The latching mechanism 142 includes a vertically extending bar 144. The upper and lower ends of the bar 144 are formed with upper and lower keeper pins 146 and 148 which are spaced to one side of the bar 144 by short integral offsets 150. These keepers 146 and 148 are adapted to move within a pair of vertically aligned arcuate grooves 160 and 161 formed in the upper portion of the rear wall 36 and in the platform 30, respectively. The intermediate portion of the bar 144 is rigidly affixed to a hand grip 162. This hand grip 162 is of looped configuration and is formed with a slot 164 at a point spaced to one side of the bar 144. This slot 164 is adapted to receive a staple 166. With the hand grip 162 arranged in its position of Figure 12, a padlock or other security device (not shown) may be inserted within the staple 166 so as to lock the hand grip 162 and hence the bar 144 and its keepers 146 and 148 in the position shown in this figure. With the keepers 146 and 148 arranged within the confines of the grooves 160 and 161, as shown in Figures 12 and 13, the door 140 will be locked against outward swinging movement. Suitable means (not shown) are interposed between the door 140 and the rear wall 36 to prevent inward swinging movement of this door.

Referring now to Figures 14, 15 and 16, it is an important feature of the present invention that lock means for positively preventing the inadvertent collapse of the shipping van are provided. Such locking means are disposed at the front central portion of both side walls 38 and 40. This locking means includes a rectangular, vertically extending latch bar 200 having its lower end pivotally affixed within the confines of the lower front portion of the upper panel 42 by a pivot pin 202. This latch bar 200 is free to rotate in a counter-clockwise direction from its solid outline position of Figure 14 to its dotted outline position therein, such movement taking place through aligned vertical slots 204 formed in the front framing 205 of the upper and lower panels 42 and 44. Rearwardly of the latch bar 200, the upper panel 42 is formed with a trip mechanism, generally designated 206. This trip mechanism 206 includes a horizontal trip pin 208. The front end of this trip pin 208 abuts the intermediate portion of the latch bar 200 when the latter is disposed in its upper position of Figure 14. The trip pin 208 is slidably supported within suitable bores 210 and 212 formed in vertical framing members 214 and 216 of the upper panel 42. The intermediate portion of the trip pin 208 is formed with a collar 218. The rear surface of this collar 218 abuts the outer portion of an actuating finger 220 of hooked configuration. This actuating finger 220 is affixed within the upper panel 42 by vertically extending pivot pin 222 disposed inwardly of pin 208. In its normal position the end of the finger 220 remote from pin 208 extends within the confines of the open shipping panel in the path of the front tension rod 112.

With this arrangement, the trip pin 208 is normally disposed in its solid outline position of Figures 14 and 16. At this time it will be in its rearward position relative to the panel 42. When, however, the tension rod 112 is pivoted rearwardly preparatory to collapsing the shipping van, its upper portion will engage the innermost part of the actuating finger 220 so as to pivot the latter in a counter-clockwise direction as viewed in Figure 16. Such counter-clockwise movement of the actuating finger 220 will effect a concurrent forward longitudinal movement of the trip pin 208. This movement of the trip pin 208 will in turn cause the latter to forcibly engage the latch bar 200 and urge it to rotate in a counter-clockwise direction. Such rotation will continue until the upper portion of the latch bar 200 has passed over the center of the pivot pin 202. The latch bar 200 will then continue to move in a counter-clockwise direction under the influence of gravity until it swings within the confines of the lower panel 44. It will thereafter be retained in this position under the influence of gravity so as to form a rigid splice that positively prevents the inward collapse of the panels 42 and 44 of side wall 38. An identical arrangement is provided for the opposite side wall 40. The latch bars of the aforedescribed lock mechanisms will remain in their locked position until such time as an operator located on the exterior of the shipping van swings them upwardly to their original positions. The shipping van may then be collapsed to its position of Figure 4.

Referring now to Figures 1, 19, 20 and 21 there is shown means for retaining the front wall 34 in a closed position. Such means includes a pair of arms 240 and 242 which normally extend horizontally to either side of the center of the front wall 34. The adjacent portions of these arms 240 and 242 are formed with plates 244 and 246, respectively, which are offset rearwardly from the major portion of the arms. As indicated in Figure 20, the plate 244 is normally adapted to overlie the plate 246 so that a horizontal bore 248 formed in plate 244 will be in alignment with a similar bore 250 formed in plate 246. A padlock or other security device (not shown) may be inserted through the bores 248 and 250 so as to retain the arms 240 and 242 in their horizontal position of Figure 20. The intermediate portion of each arm is supported by a bracket 252 having its upper portion affixed to the front of the front wall 34. As shown particularly in Figures 19 and 20, the outer portion of arm 240 is pivotally supported upon the outer portion of the front wall 34 by a pin 254, the arm being keyed to this pin. The pin 254 extends through the front wall 34 and its rear end is keyed to a downwardly-facing hook member 256. The outer end of the hook member 256 is adapted to fit within a socket 258 formed in the front portion of the hinge 56. A vertical slot 259 is likewise formed through the front tension rod 112 to permit passage of the hook member 256. The outer end of arm 242 is likewise connected to a second hook member 257, as shown in Figure 1.

With this arrangement, the front wall 34 will be rigidly supported in its closed position of Figures 19, 20 and 21 when the hooks 256 and 257 are disposed in its respective socket 258. When it is desired to open the front wall 34, the padlock or other security device will be withdrawn from the bores 248 and 250 so as to permit the arms 240 and 242 to be pivoted downwardly from their positions of Figure 19. Such downward pivotal movement of these arms will effect concurrent upwardly pivotal movement of the hooks 256 and 257 so as to withdraw them from their sockets 258. The front wall 34 may then be swung forward to its open position of Figure 1.

Referring now to Figures 1 and 2, there is shown means for retaining the rear wall 36 in its closed position. This means includes a latch arm 270 disposed at the outer portion of each side of the rear wall 36; only one of these latch arms being visible in the drawings and the following description is directed to the visible latch arm. The outer portion of latch arm 270 is formed with a downwardly-facing hook 280, while the intermediate portion of the latch arm is pivotally affixed to the rear wall 36 by a pivot pin 282. The hinge 56 is formed at its rear portion with a socket 284 which is adapted to receive the hook 280 of the latch arm 270. Additionally, vertically extending slot 286 is formed in the rear tension rod 113 to permit passage of the hook portion of the latch arm 270. The latch arm 270 is normally retained in its horizontal position of Figure 21 by means of a retainer block 288 that is affixed to the front of the rear wall 36. The fit of the pin 282 relative to the intermediate portion of the latch arm 270 is sufficiently loose that when it is desired to open the rear wall 36 the inner portion of the latch arm 270 may be pulled forwardly and over the retainer block 288 so as to permit the latch arm to be rotated in a clockwise direction relative to its solid outline position of Figure 22. Such rotation will cause the hook 280 to be lifted out of its socket 284. As noted above, an identical arrangement is provided for the opposite side of the rear wall 36. With both of the latch arms in the vertically extending position indicated in dotted outline in Figure 22, the rear wall 36 may be swung inwardly to its position of Figures 3 and 4.

In the operation and use of the aforedescribed preferred form of shipping van, the van may be conveniently loaded using the lowered front wall 34 as a loading ramp, as indicated in Figure 1. After the van is loaded, the front door will be raised and securely locked by means of the aforedescribed mechanism shown particularly in Figures 19, 20 and 21. At this time the upper end of the tension links 112 and 113 will be directly connected to the lower end of the body 88 of the lifting ring assemblies 86, as indicated in Figures 5 and 10. The loaded van may then be raised utilizing lifting cables 87 attached to the lifting ring assemblies. It is an important feature of the present invention that the van may be raised and lowered by means of these lifting ring assemblies, since the vans are often stowed so close together as to render difficult or even preclude the use of a conventional sling of the type which would be extended underneath the front and rear ends of the platform 30. Additionally, it will be readily appreciated that the lifting ring assemblies 86 are much more accessible for connection with the lifting cables than is the case with a conventional sling.

It is another important feature of the present invention that the loaded shipping van will remain comparatively watertight. To this end, weather stripping 300 and 302 extends longitudinally along the front and the sides of the tension rods 112 and 113, as indicated in Figure 7. Referring to this figure, it will be observed that with the tension rod 112 in its vertically extending, load-supporting position, the weather stripping 300 and 302 will abut the inner surfaces of the front wall 34 and the front portion of the side wall 38. The other three tension rods are similarly provided with such weather stripping. Referring now to Figures 21 and 22 it will be noted that the hook elements 256 and 280 when extended through the slots 259 and 286, respectively, will exert positive pressure against the front and rear tension rods so as to maintain their weather stripping in tight, sealing engagement with the abutting surfaces of the front, side and rear walls. With reference to Figures 1 and 6, it should likewise be observed that flashing strips 304 and 306 are interposed between the sides of the top wall 32 and the upper edge of the panels 42 and 46 of the side walls 38 and 40. Similar flashing strips 306 are interposed between the lower edge of each panel 44 and 48 and the upper edges of the base elements 85. These flashing strips will deflect any water falling upon the van downwardly over the junctures of these panels. Such flashing strips 304 will be secured solely to the top wall 32 while the flashing strips 306 will be secured solely to the side wall panels 44 and 48. An additional flashing strip 307 is shown in Figure 11 for the rear wall 32.

If prior to or during the time the loaded van is undergoing shipment, it becomes desirable for authorized personnel to have access to the interior thereof, the rear door 140 may be opened. This eliminates the necessity of opening the front wall 34.

When the van is to be completely unloaded, the front wall 34 will be lowered to its position of Figure 1. At the conclusion of the unloading, the hinge pins 72 are moved inwardly relative to the bores 84 formed in the front portion of the base elements 85 so as to detach the front wall 34 from the platform 30. Next, the front wall will be slid rearwardly until it directly overlies the platform 30. Thereafter, the rear wall 36 will be swung inwardly so as to directly overlie the front wall 34. The upper ends of the four tension rods 112 will then be disengaged from the lifting ring assemblies 86 by withdrawing the keepers 106 from body 88. The lifting ring assemblies 86 will rise to their uppermost position of Figure 9. The tension rods 112 and 113 may then be pivoted downwardly and inwardly, as indicated in Figure 2. As noted hereinbefore, the rearward movement of the front tension rods 112 will automatically cause the latch bars 200 to move into their solid outline position of Figure 14 and thereby positively prevent the inadvertent inward collapse of the side walls 38 and 40. This is an important safety feature since the only support for the top wall 34 and hence the side walls 38 and 40 is provided by the lifting cables 87. Accordingly, if through failure of the cables, the crane operating mechanism, or through human error, the top wall 32 was permitted to fall, any workmen within the van could undergo serious injury.

At such time as it is determined that no personnel remain within the confines of the shipping van, a workman disposed forwardly thereof will lift the two latch bars 200. The top wall 32 will then be lowered so as to permit the side walls 38 and 40 to fold inwardly in the manner indicated in Figure 3. The top wall 32 will continue to be lowered until it directly overlies the folded together side walls in the manner indicated in Figure 4. The collapsed van will then be ready for reshipment to a point where it will again be loaded.

From the foregoing description it will be apparent that the preferred form of collapsible van embodying the present invention will effect considerable savings in shipping costs as compared to conventional shipping vans. Despite the fact that the van of the present invention can be readily collapsed, it is provided with safety means for positively restraining its inadvertent collapse. Additionally, the van is easy to manipulate and does not require the use of the conventional sling. Its weight may be but slightly greater than that of a conventional van because of the provision of the tension rods 112 and 113 which serve to transmit the load supported by the platform 30 to the lifting ring assemblies 85. When the van is arranged in its collapsed position of Figure 4, its component parts will remain positively interconnected and therefor cannot become lost. Because of the provisions made for padlocking the front wall and the rear door, pilferage of the contents of the van will be prevented.

While there has been shown and described hereinabove what is presently considered to be a preferred embodiment of the present invention, it will be apparent that various modifications and changes may be made thereto without departing from the spirit of the invention or the scope of the following claims.

I claim:

1. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; lifting assemblies carried by said top wall; and tension rods having their lower ends pivotally connected to said platform and their upper ends removably connected to said lifting assemblies, with said tension rods being foldable downwardly towards said platform when their upper ends are disconnected from said lifting assemblies.

2. A collapsible shipping van, comprising: a platform; a top wall; a front wall; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; lifting assemblies carried by said top wall; and tension rods having their lower ends pivotally connected to said platform and their upper ends removably connected to said lifting assemblies, with said tension rods being foldable downwardly towards said platform when their upper ends are disconnected from said lifting assemblies.

3. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall and foldable inwardly so as to overlie said platform with said top wall directly overlying said folded side walls; lifting assemblies carried by said top wall; tension rods having their lower ends pivotally connected to said platform and their upper ends removably connected to said lifting assemblies; and lock means interposed between each side wall for restraining their inadvertent inward folding, said lock means including an actuating finger disposed in the path followed by one of said tension rods when it is disconnected from its respective lifting assembly and is pivoted towards said platform.

4. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall and having adjoining pivotally connected panels that are foldable inwardly so as to overlie said platform with said top wall directly overlying said folded side walls; lifting assemblies carried by said top wall; tension rods having their lower ends pivotally connected to said platform and their upper ends removably connected to said lifting assemblies; and lock means interposed between the panels of each side wall for restraining their inadvertent inward folding, said lock means including a latch carried by one of said panels and movable into engagement with the adjoining panel to lock them against relative folding, a trip bar supported by said one panel and an actuating finger operatively connected to said trip bar so as to cause it to move said latch into engagement with said adjoining panel, said finger being disposed in the arcuate path followed by one of said tension rods when it is disconnected from its respective lifting assembly and is pivoted towards said platform.

5. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; lifting assemblies carried by said top wall; tension rods having their lower ends pivotally connected to said platform and their upper ends removably connected to said lifting assemblies; and lock means interposed between the panels of each side wall for restraining their inadvertent inward folding, said lock means including an actuating finger disposed in the path followed by one of said tension rods when it is disconnected from its respective lifting assembly and is pivoted towards said platform.

6. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; lifting assemblies carried by said top wall; tension rods having their lower ends pivotally connected to said platform and their upper ends removably connected to said lifting assemblies; and lock means interposed between the panels of each side wall for restraining their inadvertent inward folding, said lock means including a latch carried by one of said panels and movable into engagement with the other panel to lock them against relative folding, a trip bar supported by said one panel and an actuating finger operatively connected to said trip bar so as to cause it to move said latch into engagement with said other panel, said finger being disposed in the arcuate path followed by one of said tension rods when it is disconnected from its respective lifting assembly and is pivoted towards said platform.

7. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall and foldable inwardly so as to overlie said platform with said top wall directly overlying said folded side walls; a lifting assembly carried by each corner of said top wall; tension rods having their lower ends pivotally connected to said platform and their upper ends removably connected to said lifting assemblies; and weatherstripping extending along each of said tension rods so as to engage the adjoining interior corner surfaces of said van when the upper end of each of said rods is connected to its respective lifting assembly.

8. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; a lifting assembly carried by each corner of said top wall; tension rods having their lower ends pivotally connected to said platform and their upper ends removably connected to said lifting assemblies; weatherstripping extending along each of said tension rods so as to engage the adjoining interior corner surfaces of said van when the upper end of each of said rods is connected to its respective lifting assembly; and lock means interposed between the panels of each side wall for restraining their inadvertent inward folding, said lock means including an actuating finger disposed in the path followed by one of said tension rods when it is disconnected from its respective lifting assembly and is pivoted towards said platform.

9. A collapsible shipping van, comprising: a platform; a top wall; a front wall foldable downwardly to define a loading ramp; means interconnecting said front wall and said platform whereby said front wall may be moved rearwardly when said van is to be collapsed and overlie said platform; a rear wall foldable inwardly when said van is to be collapsed so as to overlie said platform; a pair of side walls interposed between said platform and said top wall, each side wall having an upper panel and a lower panel that are hingedly interconnected so as to fold inwardly when said top wall is lowered until they overlie said platform with said top wall directly overlying said folded-together side walls; a lifting assembly carried by each corner of said top wall; tension rods having their lower ends pivotally connected to said platform and their upper ends removably connected to said lifting assemblies; weatherstripping extending along each of said tension rods so as to engage the adjoining interior corner surfaces of said van when the upper end of each of said rods is connected to its respective lifting assembly; and lock means interposed between the panels of each side wall for restraining their inadvertent inward folding, said lock means including a latch bar carried by one of said panels and movable into engagement with the other panel to lock them against relative folding, a trip pin supported by said one panel and an actuating finger operatively connected to said trip pin so as to cause it to move said latch bar into engagement with said other panel, said finger being disposed in the arcuate path followed by one of said tension rods when it is disconnected from its respective lifting assembly and is pivoted towards said platform.

10. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; and a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls.

11. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; and tension elements interconnecting said platform and said lifting assemblies for transmitting the weight supported by said platform to said lifting assemblies.

12. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; and tension rods having their lower ends pivotally connected to said platform and their upper ends removably connected to said lifting assemblies.

13. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; tension rods having their lower ends pivotally connected to said platform and their upper ends removably connected to said lifting assemblies; and lock means interposed between the panels of each side wall for restraining their inadvertent inward folding, said lock means including an actuating finger disposed in the path followed by one of said tension rods when it is disconnected from its respective lifting assembly and is pivoted towards said platform.

14. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; tension rods having their lower ends pivotally connected to said platform and their upper ends removably connected to said lifting assemblies; and lock means interposed between the panels of each side wall for restraining their inadvertent inward folding, said lock means including a latch bar carried by one of said panels and movable into engagement with the other panel to lock them against relative folding, a trip pin supported by said one panel and an actuating finger operatively connected to said trip pin so as to cause it to move said latch bar into engagement with said other panel, said finger being disposed in the arcuate path followed by one of said tension rods when it is disconnected from its respective lifting assembly and is pivoted towards said platform.

15. A collapsible shipping van, comprising: a platform; a top wall, a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; tension rods having their lower ends pivotally connected to said platform and their upper ends removably connected to said lifting assemblies; a lifting assembly carried by each corner of said top wall; tension rods having their lower ends pivotally connected to said platform and their upper ends removably connected to said lifting assemblies; and weatherstripping extending along each of said tension rods so as to engage the adjoining interior corner surfaces of said van when the upper end of each of said rods is connected to its respective lifting assembly.

16. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; tension rods having their lower ends pivotally connected to said platform and their upper ends removably connected to said lifting assemblies; lock means interposed between the panels of each side wall for restraining their inadvertent inward folding, said lock means including an actuating finger disposed in the path followed by one of said tension rods when it is disconnected from its respective lifting assembly and is pivoted towards said platform; a lifting assembly carried by each corner of said top wall; tension rods having their lower ends pivotally connected to said platform and their upper ends removably connected to said lifting assemblies; and weatherstripping extending along each of said tension rods so as to engage the adjoining interior corner surfaces of said van when the upper end of each of said rods is connected to its respective lifting assembly.

17. A collapsible shipping van, comprising: a platform; a top wall; a front wall; hinge means interposed between the lower edge of said front wall and said platform whereby said front wall may be pivoted forwardly to define a loading platform, said hinge means also being disengageable so as to permit said front wall to be slid rearwardly until it directly overlies said platform when said van is to be collapsed; a rear wall having its lower edge hingedly connected to said platform whereby it may be pivoted forwardly so as to directly overlie said front wall when said van is to be collapsed; a pair of side walls, each having an upper panel and a lower panel, said upper panels having their upper edges hingedly connected to said top wall and said lower panels having their lower edges hingedly connected to said platform with the adjoining edges of said panels being hingedly interconnected so as to be foldable inwardly when said top wall is lowered until they overlie said rear wall, said top wall then directly overlying the upper panels of the folded-together side walls; lifting assemblies carried by said top wall; tension rods having their lower ends pivotally connected to said platform and their upper ends removably connected to said lifting assemblies; lock means interposed between the panels of each side wall for restraining their inadvertent inward folding, said lock means including a latch bar carried by one of said panels and movable into engagement with the other panel to lock them against relative folding, a trip pin supported by said one panel and an actuating finger operatively connected to said trip pin so as to cause it to move said latch bar into engagement with said other panel, said finger being disposed in the arcuate path followed by one of said tension rods when it is disconnected from its respective lifting assembly and is pivoted towards said platform; a lifting assembly carried by each corner of said top wall; tension rods having their lower ends pivotally connected to said platform and their upper ends removably connected to said lifting assemblies; and weatherstripping extending along each of said tension rods so as to engage the adjoining interior corner surfaces of said van when the upper end of each of said rods is connected to its respective lifting assembly.

References Cited in the file of this patent

UNITED STATES PATENTS

| 2,000,067 | Maure | May 7, 1935 |
| 2,200,277 | Howie | May 14, 1940 |
| 2,219,978 | Caldwell | Oct. 29, 1940 |
| 2,579,655 | Donald | Dec. 25, 1951 |
| 2,868,407 | Woodcock | Jan. 13, 1959 |

FOREIGN PATENTS

| 412,297 | Great Britain | June 28, 1934 |